(12) United States Patent
Leboeuf, Jr.

(10) Patent No.: US 7,481,700 B1
(45) Date of Patent: Jan. 27, 2009

(54) SHELLFISH CLAW CUTTER

(76) Inventor: Godfrey J. Leboeuf, Jr., 1902 Bayou Blue Rd., Houma, LA (US) 70364

( * ) Notice: Subject to any disclaimer, the term of this patent is extended or adjusted under 35 U.S.C. 154(b) by 0 days.

(21) Appl. No.: 11/952,200

(22) Filed: Dec. 7, 2007

(51) Int. Cl.
*A22C 29/02* (2006.01)
(52) U.S. Cl. .......................................................... 452/6
(58) Field of Classification Search .............. 452/1–13, 452/16, 17; 30/120.1–120.5
See application file for complete search history.

(56) References Cited

U.S. PATENT DOCUMENTS

| | | | | |
|---|---|---|---|---|
| 463,912 A | * | 11/1891 | McVltty | 86/22 |
| 2,473,608 A | * | 6/1949 | Plock | 452/17 |
| 3,685,097 A | * | 8/1972 | Scott et al. | 452/17 |
| 3,771,197 A | * | 11/1973 | Heuer, Sr. | 452/103 |
| 5,351,402 A | * | 10/1994 | Mansfield | 30/120.3 |
| 6,785,967 B1 | * | 9/2004 | Allievi | 30/120.1 |
| 7,169,033 B1 | * | 1/2007 | Colbert | 452/103 |

* cited by examiner

*Primary Examiner*—Thomas Price
(74) *Attorney, Agent, or Firm*—David A. Lingbeck

(57) ABSTRACT

A shellfish claw cutter for precisionally cutting the claws of shellfish. The shellfish claw cutter includes a first cutting member having a first cutting portion and a first handle portion; and also includes a second cutting member being pivotally attached to the first cutting member and having a second cutting portion and a second handle portion; and further includes biased members being attached to the first and second cutting members for biasing the first and second cutting portions away from one another.

9 Claims, 2 Drawing Sheets

SHELLFISH CLAW CUTTER

BACKGROUND OF THE INVENTION

1. Field of the Invention

The present invention relates to claw cutters and more particularly pertains to a new shellfish claw cutter for precisionally cutting the claws of shellfish.

2. Description of the Prior Art

The use of claw cutters is known in the prior art. More specifically, claw cutters heretofore devised and utilized are known to consist basically of familiar, expected and obvious structural configurations, notwithstanding the myriad of designs encompassed by the crowded prior art which have been developed for the fulfillment of countless objectives and requirements.

The prior art includes cutters which essentially crack or smash the claw of the shellfish. None of the cutters in the prior art is structured to effectively cut only the claw and not the meat in the claw.

SUMMARY OF THE INVENTION

The general purpose of the present invention, which will be described subsequently in greater detail, is to provide a new shellfish claw cutter which has many of the advantages of the claw cutters mentioned heretofore and many novel features that result in a new shellfish claw cutter which is not anticipated, rendered obvious, suggested, or even implied by any of the prior art claw cutters, either alone or in any combination thereof. The present invention includes a first cutting member having a first cutting portion and a first handle portion; and also includes a second cutting member being pivotally attached to the first cutting member and having a second cutting portion and a second handle portion; and further includes biased members being attached to the first and second cutting members for biasing the first and second cutting portions away from one another. None of the prior art includes the combination of the elements of the present invention.

There has thus been outlined, rather broadly, the more important features of the shellfish claw cutter in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new shellfish claw cutter which has many of the advantages of the claw cutters mentioned heretofore and many novel features that result in a new shellfish claw cutter which is not anticipated, rendered obvious, suggested, or even implied by any of the prior art claw cutters, either alone or in any combination thereof.

Still another object of the present invention is to provide a new shellfish claw cutter for precisionally cutting the shell parts of the claws of shellfish.

Still yet another object of the present invention is to provide a new shellfish claw cutter that allows the user to effectively cut only the shell part of the claw and not the meat in the claw.

Even still another object of the present invention is to provide a new shellfish claw cutter that makes it much easier for the user to cut and remove the shell parts of the claws without also cutting off the meat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
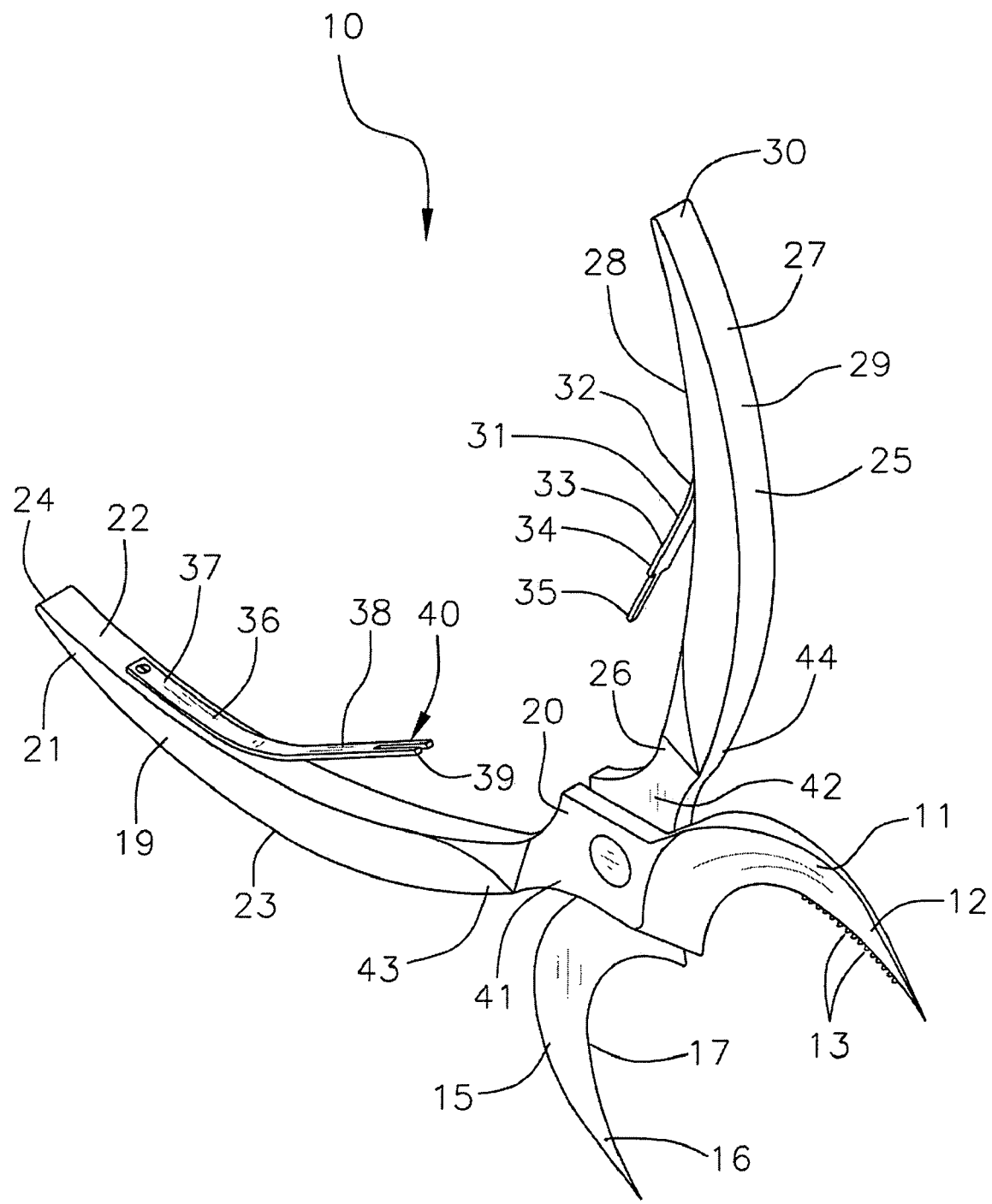
FIG. 1 is a perspective view of a new shellfish claw cutter according to the present invention.
Figure 2:
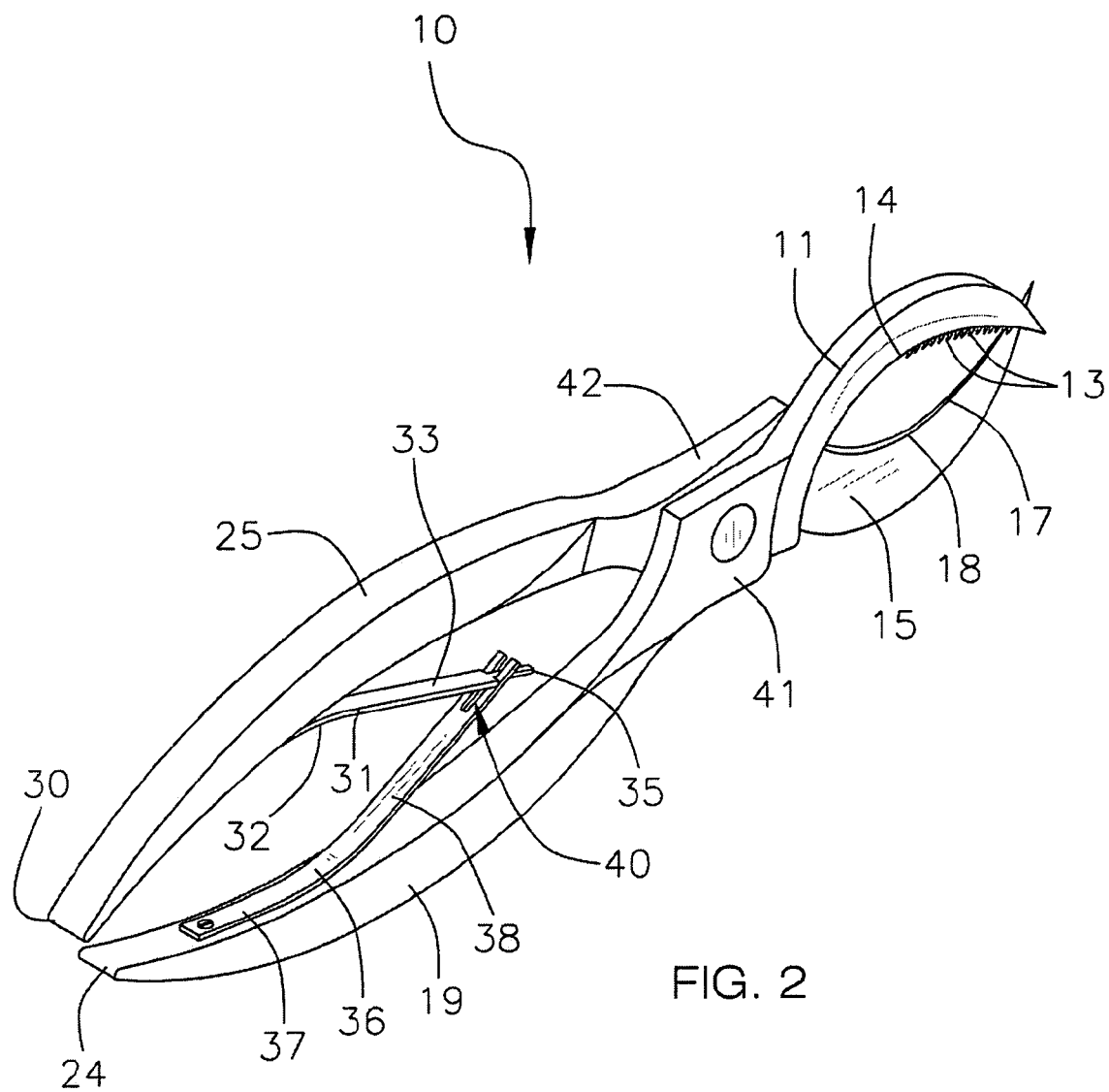
FIG. 2 is a perspective view of the present invention.

With reference now to the drawings, and in particular to FIGS. 1 through 2 thereof, a new shellfish claw cutter embodying the principles and concepts of the present invention and generally designated by the reference numeral 10 will be described.

As best illustrated in FIGS. 1 through 2, the shellfish claw cutter 10 generally comprises a first cutting member 43 having a first cutting portion 11 and a first handle portion 19, and also comprises a second cutting member 44 being conventionally and pivotally attached to the first cutting member 43 and having a second cutting portion 15 and a second handle portion 25. The first cutting portion 11 has a first cutting edge 12 being inwardly bowed of the first cutting portion 11. The second cutting portion 15 has a second cutting edge 16 being inwardly bowed of the second cutting portion 15. The first and second cutting edges 12,16 appose one another and are bowed in opposite directions of one another. Each of the first and second cutting edge 12,16 has a midpoint 14,18. The midpoint 14 of the first cutting edge 12 is spaced from the midpoint 18 of the second cutting edge 16 upon the first and second cutting portions 11,15 being closed upon and engaged with one another to effectively cut only a shell part of a claw of a shellfish and not cut the meat in the claw. The midpoints 14,18 of the first and second cutting edges 12,16 are spaced approximately 6 mm upon the first and second cutting portions 11,15 being closed upon and engaged with one another so that only the shell part of the claw of the shellfish is cut and not the meat in the claw. The first cutting edge 12 includes a plurality of teeth 13 being spacedly and integrally arranged therealong. The second cutting edge 16 is a blade. The first and second cutting members 43,44 include first and second midsections 41,42 which are pivotally and conventionally attached to one another. The first and second midsections 41,42 separate the first and second cutting portions 11,15 from the first and second handle portions 19,25.

The shellfish claw cutter also comprises biased members 31,36 being conventionally attached to the first and second cutting members 43,44 for biasing the first and second cutting portions 11,15 away from one another. The biased members 31,36 include a first leaf spring 31 being fastened with a rivet to the first handle portion 19, and also include a second leaf spring 36 being fastened with another rivet to the second handle portion 25 and being engageable to the first leaf spring 31. The first leaf spring 31 includes a first end portion 32 being fastened to the first handle portion 19 and includes a second end portion 33 being angled relative to the first end portion 32 and being engageable to the second leaf spring 36. The second leaf spring 36 includes a first end portion 37 being fastened to the second handle portion 25 and includes a second end portion 38 being angled relative to the first end portion 37 of the second leaf spring 36 and being engageable to the second end portion 33 of the first leaf spring 31 to bias the first and second cutting portions 11,15 away from one another. The second end portion 33 of the first leaf spring 31 has a main portion 34 and a finger portion 35 being in alignment with and integrally extending outwardly from the main portion 34. The finger portion 35 has a width smaller than a width of the main portion 34 and is centered on the second end portion 33 of the first leaf spring 31. The second end portion 38 of the second leaf spring 36 has an end 39 and a longitudinal slot 40 being centered and extending through the end 39 and extending a selected distance in the second end portion 38 of the second leaf spring 36. The finger portion 35 is movably extended in the longitudinal slot 40 to bias the first and second cutting portions 11,15 away from one another. Each of the first and second handle portions 19,25 has an outer side 23,29 and an inner side 22,28, wherein the inner sides 22,28 face each other. The first and second leaf springs 31,36 are fastened with the rivets to the respective inner sides 22,28 near bottom ends 24,30 of the first and second handle portions 19,25. The first and second leaf springs 31,36 are disposed between the first and second handle portions 19,25 and extend toward the midsections 41,42 of the first and second cutting members 43,44. Each inner side 22,28 has an essentially flat surface and each outer side 23,29 having an essentially rounded surface. Each outer side 23,29 has a top portion 20,26 and a gripping bottom portion 21,27.

In use, the user takes a cooked shellfish having claws and takes the shellfish claw cutter 10 and places the first and section cutting portions 11,15 about the claw and squeezes the first and second handle portions 19,25 together causing the first and second cutting edges 12,16 to cut through only the shell part of the claw and not the meat inside the claw. The user then simply slides the shell part of the claw off the meat and is ready to serve the meat from the claw.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the shellfish claw cutter. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shellfish claw cutter comprising:
    a first cutting member having a first cutting portion and a first handle portion;
    a second cutting member being pivotally attached to said first cutting member and having a second cutting portion and a second handle portion; and
    biased members being attached to said first and second cutting members for biasing said first and second cutting portions away from one another, said biased members including a first leaf spring being fastened to said first handle portion, and also including a second leaf spring being fastened to said second handle portion and being engageable to said first leaf spring, said first leaf spring including a first end portion being fastened to said first handle portion and including a second end portion being angled relative to said first end portion and being engageable to said second leaf spring, said second leaf spring including a first end portion being fastened to said second handle portion and including a second end portion being angled relative to said first end portion of said second leaf spring and being engageable to said second end portion of said first leaf spring to bias said first and second cutting portion away from one another, said second end portion of said first leaf spring having a main portion and a finger portion being in alignment with and extending outwardly from said main portion, said finger portion having a width smaller than a width of said main portion and being centered on said second end portion of said first leaf spring.

2. The shellfish claw cutter as described in claim 1, wherein said second end portion of said second leaf spring has an end and a longitudinal slot being centered and extending through said end and extending a selected distance in said second end portion of said second leaf spring, said finger portion movably extending in said longitudinal slot to bias said first and second cutting portions away from one another.

3. The shellfish claw cutter as described in claim 2, wherein each said first and second handle portions has an outer side and an inner side, wherein said inner sides facing each other, said first and second leaf springs being fastened to respective said inner sides near bottom ends of said first and second handle portions.

4. The shellfish claw cutter as described in claim 3, wherein said first and second leaf springs being disposed between said first and second handle portions and extending toward said mid portions of said first and second cutting members.

5. The shellfish claw cutter as described in claim 4, wherein each said inner side has an essentially flat surface and each said outer side having an essentially rounded surface.

6. The shellfish claw cutter as described in claim 5, wherein each said outer side has a top portion and a gripping bottom portion.

7. A method of cutting a shellfish claw without cutting the meat in the shellfish claw includes the steps of:
    providing a first cutting member having a first cutting portion and a first handle portion, and a second cutting member being pivotally attached to said first cutting member and having a second cutting portion and a second handle portion, and biased members being attached to said first and second cutting members for biasing said first and second cutting portions away from one another;
    positioning a shellfish claw between said first and second cutting portions;

urging said first and second handle portions toward one another with said first and second cutting portions cutting precisely through only the shell of the shellfish claw and not the meat inside the shellfish claw; and removing only the shell from the shellfish claw thus exposing the meat inside the shellfish claw.

8. The method of cutting a shellfish claw without cutting the meat in the shellfish claw as described in claim 7, wherein the step of providing first and second cutting members further includes the step of providing a first cutting edge being inwardly bowed of said first cutting portion and a second cutting edge being inwardly bowed of said second cutting portion, said first and second cutting edges being opposed to one another and being bowed in opposite directions of one another.

9. The method of cutting a shellfish claw without cutting the meat in the shellfish claw as described in claim 8, wherein the step of providing first and second cutting edges further includes the step of providing each of said first and second cutting edges having a midpoint, said midpoint of said first cutting edge being spaced from said midpoint of said second cutting edge upon said first and second cutting portions being closed upon and engaged with one another to effectively cut only a shell part of a claw of a shellfish and not cut the meat in the claw.

* * * * *